United States Patent
Negoro et al.

(10) Patent No.: US 6,240,780 B1
(45) Date of Patent: Jun. 5, 2001

(54) ANGULAR VELOCITY SENSOR

(75) Inventors: Yosuhiro Negoro, Nagaokakyo; Kazufumi Moriya, Yokohama; Yoshihiro Konaka; Shinji Kobayashi, both of Sagamihara, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/257,852

(22) Filed: Feb. 25, 1999

(30) Foreign Application Priority Data

Mar. 16, 1998 (JP) .................................................. 10-084967

(51) Int. Cl.[7] .................................................. G01P 9/04
(52) U.S. Cl. ...................... 73/504.12; 73/504.14
(58) Field of Search ........................... 73/504.12, 504.14, 73/504.15, 504.16

(56) References Cited

U.S. PATENT DOCUMENTS

| 5,780,740 | 7/1998 | Lee et al. | 73/504.12 |
| 5,804,087 | 9/1998 | Lee et al. | 216/41 |
| 5,945,599 * | 8/1999 | Fujiyoshi et al. | 73/504.12 |

FOREIGN PATENT DOCUMENTS

| 19620832 | 11/1996 | (DE) . |
| 19642893 | 4/1997 | (DE) . |
| 9745699 | 12/1997 | (WO) . |

* cited by examiner

Primary Examiner—John E. Chapman
(74) Attorney, Agent, or Firm—Ostrolenk, Faber, Gerb & Soffen, LLP

(57) ABSTRACT

An angular velocity sensor includes a board, a first vibrator, a second vibrator, a vibration generator, a displacement detector and a frequency adjuster. The first vibrator is supported on the board through first supporting beams and arranged so as to be vibrated in the direction of a first axis. The second vibrator is supported on the first vibrator through second supporting beams and arranged so as to be vibrated in the direction of the first axis and in the direction of a second axis at a right angle to the direction of the first axis. The vibration generator cause the first vibrator to vibrate in the direction of the first axis. The displacement detector detects a displacement of the second vibrator in the direction to the second axis when an angular velocity has been applied around a third axis at right angles with the first and second axes. The frequency adjuster adjusts a vibrating side resonance frequency at the time when the first vibrator is vibrated in the direction of the first axis and adjusts a detecting side resonance frequency at the time when the second vibrator is vibrated in the direction of the second axis by an angular velocity applied around the third axis.

8 Claims, 7 Drawing Sheets

ANGULAR VELOCITY SENSOR

BACKGROUND OF THE INVENTION

1. Field of the Invention

The present invention relates to an angular velocity sensor to be suitably used to detect the angular velocity acting on, for example, a moving body, a rotating body, etc.

2. Description of the Related Art

The angular velocity sensor described in Japanese Unexamined Patent Publication No. 5-312576 is generally known as an angular velocity sensor of conventional technology.

The angular velocity sensor described in Japanese Unexamined Patent Publication No. 5-312576 is in substance composed of a board, a first vibrator supported on the board through a first supporting beam and arranged so as to be vibrated in the direction of a first axis, a second vibrator supported on the first vibrator through a second supporting beam and arranged so as to be vibrated in the direction of the first axis and in the direction of a second axis at a right angle to the direction of the first axis, a vibration generating means to make the first vibrator vibrate in the direction of the first axis, and a displacement detecting means to detect a displacement of the second vibrator in the direction of the second axis when an angular velocity has been applied around a third axis at right angles with the first and second axes and when the first vibrator vibrates in the direction of the first axis.

Further, the first supporting beam, first vibrator, and second vibrator constitute a vibration system to vibrate in the direction of the first axis, and this vibration system has a vibrating side resonance frequency. More, the second supporting beam, and second vibrator constitute a detection system to vibrate in the direction of the second axis, and this detection system has a detecting side resonance frequency.

In this angular velocity sensor, when the vibration generating means makes the first vibrator vibrate in the direction of a first axis horizontal to the board, the second vibrator supported on the first vibrator through the second supporting beam vibrates in the direction of the same axis at a frequency substantially equal to the resonance frequency of the second vibrator. When the second vibrator vibrates and when the whole of the sensor rotates around a rotational axis (the third axis) vertical to the board, the second vibrator is made to vibrate in the direction (the direction of the second axis) at a right angle to the vibrating direction of the first vibrator because of Coriolis force in proportion to the rotational force. And the displacement detecting means is able to detect the angular velocity applied to the whole of the sensor by detecting a displacement at the time when the second vibrator is vibrated.

In the above angular velocity sensor of conventional technology, the vibrating side resonance frequency of the vibration system is designed to be approximated to the detecting side resonance frequency of the detection system in order to heighten accuracy of the detection.

In general, the resonance frequency f of a spring vibration is defined in the following formula 1.

$$f = \frac{1}{2\pi}\sqrt{\frac{k}{m}} \quad \text{Formula 1}$$

$k$ : spring constant of supporting beam $m$ : weight of vibrator

Also, as shown in formula 1, the resonance frequency of each system is established by the width and length of the beam (spring constant) and the weight of the vibrator. However, as the angular velocity sensor of conventional technology is produced by using processes for silicon semiconductors, fluctuation of processed dimensions occurs and it is difficult to form vibrators, supporting beams, etc. precisely. Because of this, there is a problem that each vibrator cannot be vibrated at the same resonance frequency and the detection sensitivity of angular velocity cannot be increased.

In other conventional technology, e.g., in Japanese Unexamined Utility Model Publication No. 7-32514, Japanese Unexamined Patent Publication No. 7-43166, Japanese Unexamined Patent Publication No. 7-190784, and others, there is a method such in which the spring constant is seemingly changed and the resonance frequency of the vibrators is adjusted by adjustment of a tension applied :o the supporting beam. On the other hand, as in Japanese Unexamined Patent Publication No. 8-114460, and others, there is also a method in which the resonance frequency is adjusted by adding a weight to the vibrators and trimming the weight by a laser beam, a concentrated ion beam, etc.

However, the above-mentioned methods for adjustment of the resonance frequency are used where a vibrator is supported by a supporting beam and not to an angular velocity sensor having the construction of supporting a second vibrator on a first vibrator through a second beam. And the methods are not very effective to approximate resonance frequencies to each other by adjustment of the vibrating side resonance frequency of a vibration system or the detecting side resonance frequency of a detection system.

SUMMARY OF THE INVENTION

The present invention has been made considering the above problems of conventional technology, and the object of the present invention is to provide an angular velocity sensor in which, when an angular velocity is applied around a third axis, the vibrating amplitude of a second vibrator is increased and the detection sensitivity of the angular velocity is heightened by approximating the vibrating side resonance frequency of a vibration system vibrating in the direction of a first axis to the detecting side resonance frequency of a detection system vibrating in the direction of the second axis.

In order to solve the above-mentioned problems, an angular velocity sensor according to the present invention comprises a board, a first vibrator, a second vibrator, a vibration generating means, a displacement detecting means and a frequency adjustment means. The first vibrator is supported on the board through first supporting beams and arranged so as to be vibrated in the direction of a first axis. The second vibrator is supported on the first vibrator through second supporting beams and arranged so as to be vibrated in the direction of the first axis and in the direction of a second axis at a right angle to the direction of the first axis. The vibration generating means makes the first vibrator vibrate in the direction of the first axis. The displacement detecting means detects a displacement of the second vibrator in the direction to the second axis when an angular velocity has been applied around a third axis at right angles with the first and second axes in the state that the vibration generating means causes the first vibrator to vibrate in the direction of the first axis. The frequency adjustment means adjusts the vibrating side resonance frequency at the time when the first vibrator is vibrated in the direction of the first axis by the vibration generating means and the detecting side resonance frequency at the time when the second vibrator is vibrated in the direction of the second axis by an angular velocity applied around the third axis.

When thus constructed, the vibrating side resonance frequency can be approximated to the detecting side resonance frequency by the frequency adjustment means, and when an angular velocity is applied around the third axis, the second vibrator can be vibrated so as to give a high amplitude due to Coriolis force.

The frequency adjustment means may be made a vibration adding means to add a force in the direction of the first axis to the first vibrator in the state that the vibration generating means vibrates the first vibrator in the direction of the first axis. When thus constructed, the vibration adding means vibrates the first vibrator with a high amplitude in the direction of the first axis and the spring constant of the first beam is seemingly made small. As a result, the vibrating side resonance frequency can be decreased.

When an angular velocity is added around the third axis to make the second vibrator vibrate in the direction of the second axis, the frequency adjustment means may be made a vibration adding means to add a force in the direction of the second axis to the second vibrator. When thus constructed, the vibration adding means makes the second vibrator vibrate with a high amplitude in the direction of the second axis and the spring constant of the second beam is made seemingly small. As a result, the detecting side resonance frequency can be reduced.

The frequency adjustment means may be a weight disposed on the first vibrator. When thus constructed, the weight added to the first vibrator makes the vibrating side resonance frequency low, and at the same time the vibrating side resonance frequency can be made high by trimming the weight.

The frequency adjustment means may be a weight disposed on the second vibrator. When thus constructed, the weight added to the second vibrator makes the detecting side resonance frequency low, and at the same time the detecting side resonance frequency can be made high by trimming the weight.

The vibration adding means may comprise a vibrating side additional electrode formed on an end surface of the first vibrator and a fixed side additional electrode facing the vibrating side additional electrode formed on the side of the board. When thus constructed, for example, in the state that a DC voltage is applied between the vibrating side additional electrode and the fixed side additional electrode, if the vibrating side additional electrode formed on the first vibrator moves toward the fixed side additional electrode, the electrostatic attraction between the additional electrodes is increased and this increased attraction becomes an added vibrating force. This vibrating force is able to make the first vibrator vibrate in the direction of the first axis with a high amplitude and the spring constant of the first supporting beam is made seemingly small. As a result, the vibrating side resonance frequency is made low.

The vibration adding means may comprise a vibrating side additional electrode formed on an end surface of the second vibrator and a fixed side additional electrode facing the vibrating side additional electrode formed on the side of the board. When thus constructed, for example, in the state that a DC voltage is applied between the vibrating side additional electrode and the fixed side additional electrode, at the time when the second vibrator is displaced in the direction of the second axis with the angular velocity added around the third axis, if the vibrating side additional electrode moves toward the fixed side additional electrode, the electrostatic attraction between the additional electrode is increased and this increased electrostatic force becomes an added vibrating force. This vibrating force is able to make the second vibrator vibrate in the direction of the second axis with a high amplitude and the spring constant of the second supporting beam is made seemingly small. As a result, the detecting side resonance is made frequency low.

The respective facing surfaces of the vibrating side additional electrode and the fixed side additional electrode may be made saw-toothed. When thus constructed, the dimension of the spacing between the additional electrodes can be secured by the vibration adding means and the electromagnetic attraction can be made large.

For the purpose of illustrating the invention, there is shown in the drawings several forms which are presently preferred, it being understood, however, that the invention is not limited to the precise arrangements and instrumentalities shown.

DETAILED DESCRIPTION OF PREFERRED EMBODIMENTS

Figure 1:
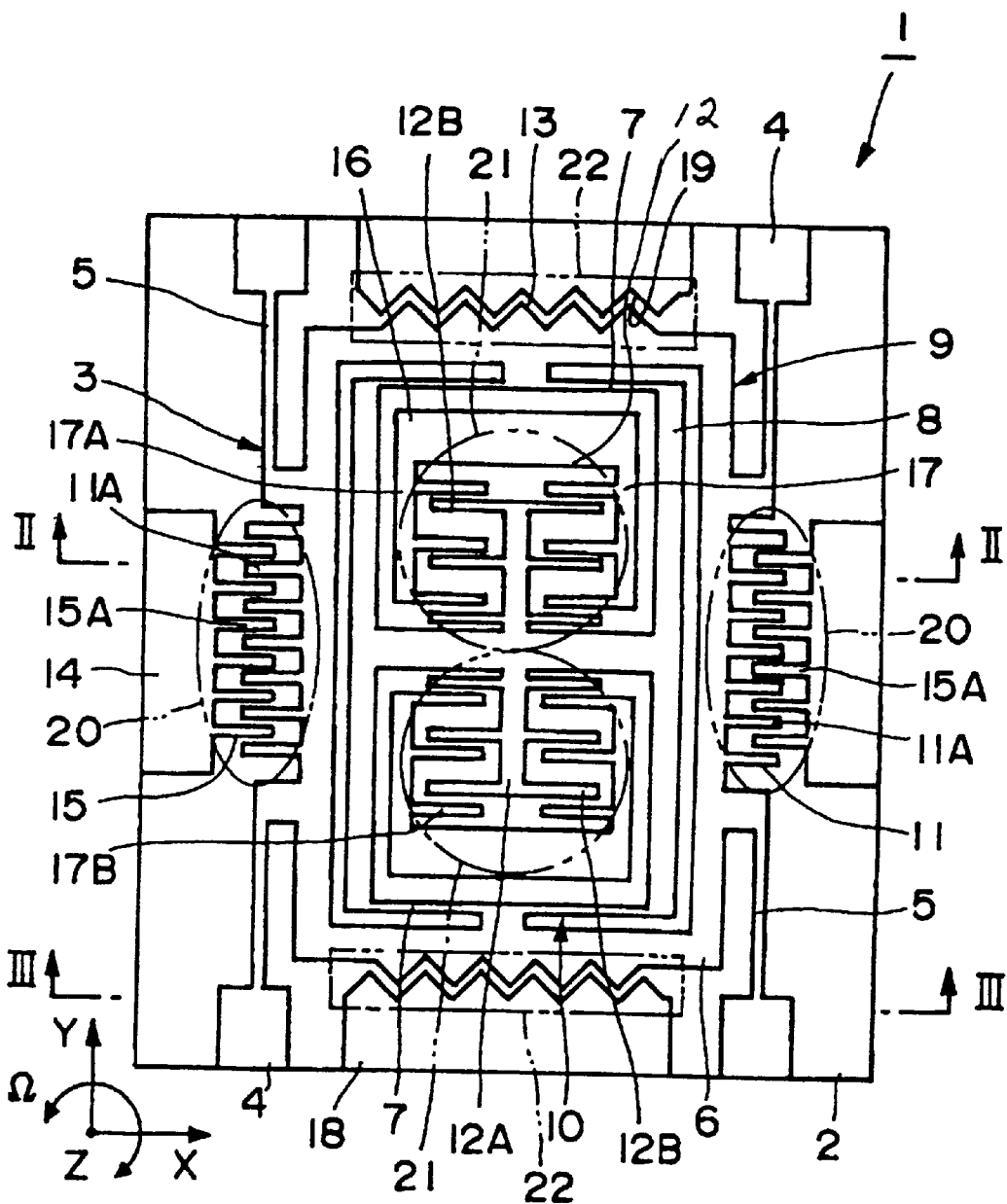
FIG. 1 is a front view showing an angular velocity sensor according to a first embodiment.
Figure 2:
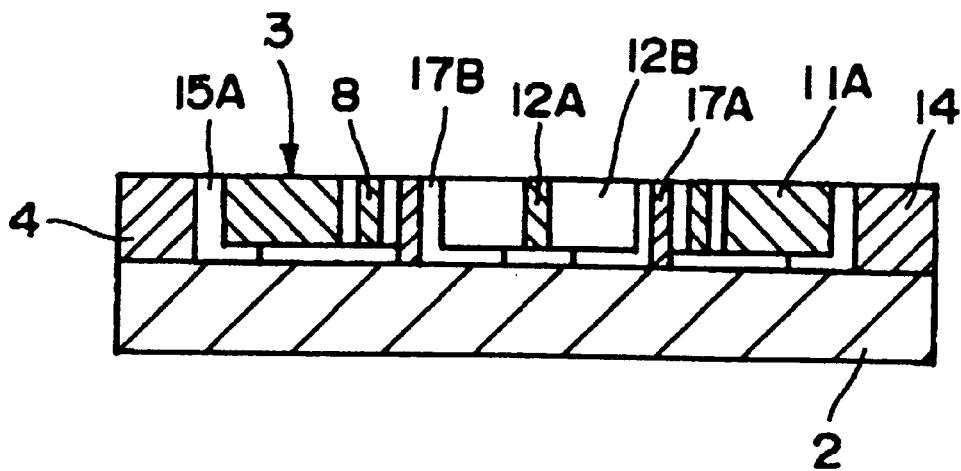
FIG. 2 is a vertical cross-sectional view taken in the direction of the arrows on line II—II of FIG. 1.
Figure 3:
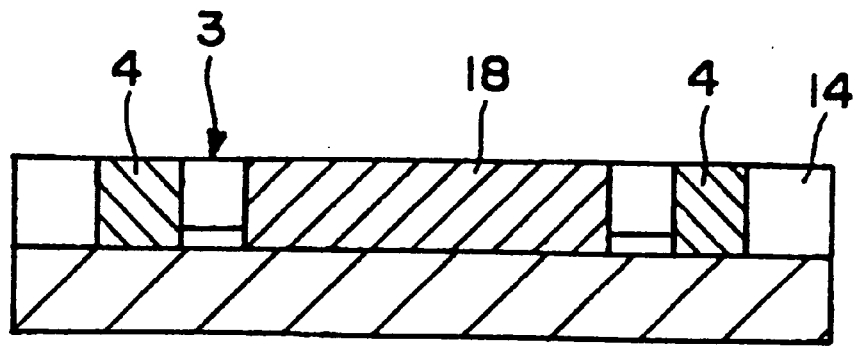
FIG. 3 is a vertical cross-sectional view taken in the direction of the arrows on line III—III of FIG. 1.
Figure 4:
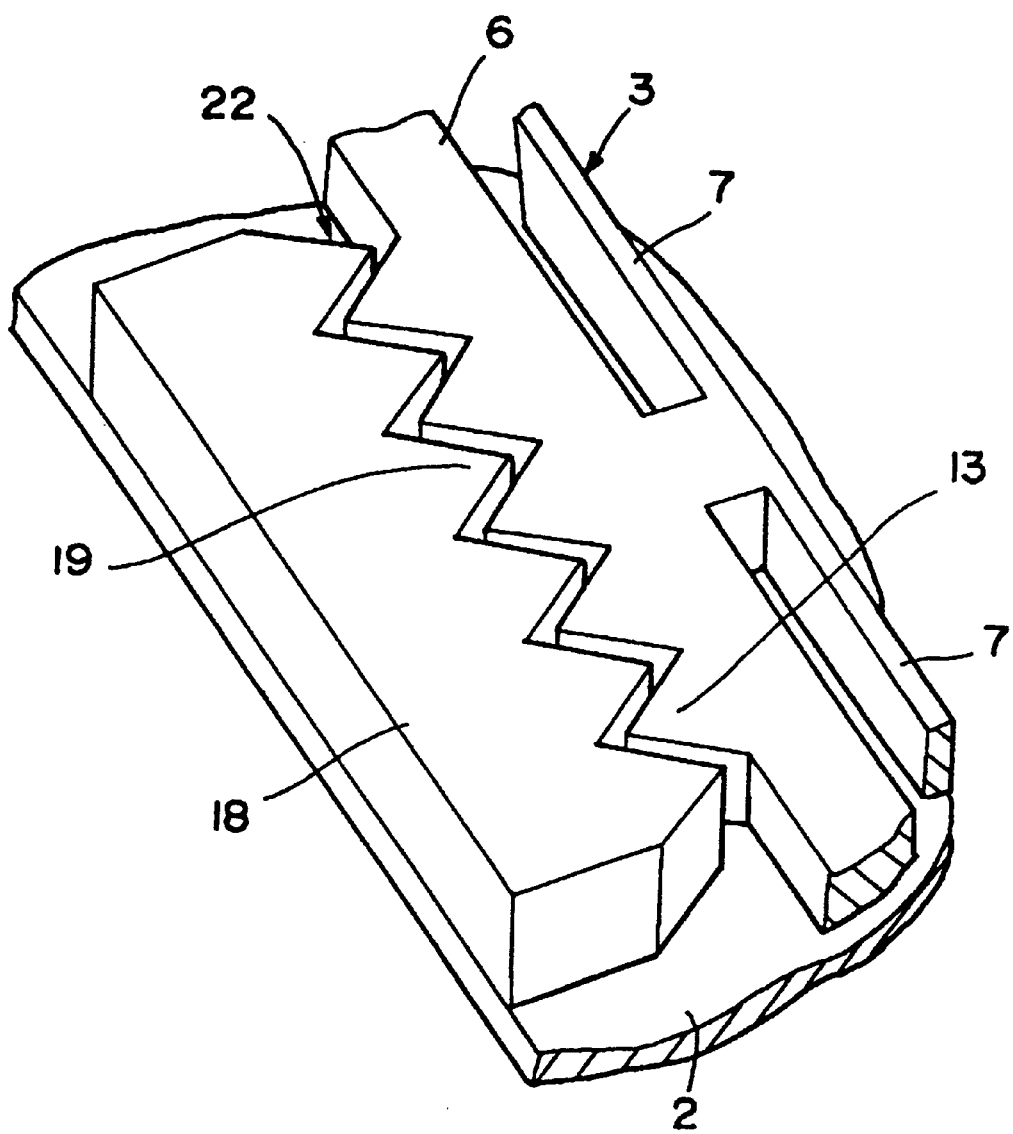
FIG. 4 is a perspective view, on an enlarged scale, of a vibration adding portion of an angular velocity sensor according to a first embodiment.

Hereinafter, the preferred embodiments of the present invention are explained in detail with reference to the drawings.

First, based on FIGS. 1 through 4, an angular velocity sensor in accordance with a first embodiment of the present invention is described.

Numeral 1 represents an angular velocity sensor and numeral 2 represents a board of a rectangular form constituting the base of the angular velocity sensor 1. The board 2 is formed by using, for example, glass material.

Numeral 3 represents a movable portion formed on the board 2 by using low resistance polysilicon, silicon single crystal, etc. having P, S, Sb, etc. doped therein, and the movable portion 3 is composed of: four supporting portions 4 located at four corners of the board 2; four first supporting beams 5 which extend from each of the supporting portions 4 in the direction of the Y axis; a first vibrator 6 formed in the form of a rectangular framework and supported by each of the first supporting beams 5 in such a way that the first vibrator 6 is spaced from the surface of the board 2 so as to be able to be displaced in the direction of the X axis; two second supporting beams 7 extended in the direction of the X axis and protruding from the middle of respective short sides of the first vibrator 6; and a second vibrator 8 formed in the form of an H and arranged so as to be able to be vibrated in the direction of the Y axis through each of the supporting beams 7.

The first supporting beams 5, first vibrator 6, and second vibrator 8 constitute a vibration system 9 to vibrate in the direction of the X axis as the direction of a first axis, and the second supporting beams 7 and second vibrator 8 constitute a detection system 10 to vibrate in the direction of the Y axis as the direction of a second axis. And the vibration system 9 has a vibrating side resonance frequency f1 to be established by the mass of the first vibrator 6 and second vibrator 8, and the spring constant of the first supporting beams 5. The detection system 10 has a detecting side resonance frequency f2 to be established by the mass of the second vibrator 8, and the spring constant of the second supporting beams 7.

Further, the first vibrator 6 has vibrating side vibrating electrodes 11 formed on and protruding from its right and left long sides which cooperate with left and right side fixed electrodes 15, respectively, and vibrating side additional electrodes 13 formed on and protruding from its upper and lower short sides which cooperate with upper and lower fixed side additional electrodes 16, respectively. In the center of the middle portion of the second vibrator 8, vibrating side detecting electrodes 12 protrude upwardly and downwardly which cooperate with left and right fixed electrodes 17, respectively.

Each of the electrodes 11 is composed of seven electrode plates 11A arranged in a comb-like configuration. The vibrating side vibrating electrodes 11 and fixed side vibrating electrodes 15, which are also arranged in a comb-like configuration, constitute a vibration generating portion 20 to be described in more detail later.

The vibrating side detecting electrodes 12 are formed in the shape of an antenna with arm portions extended in the direction of the Y axis. Six equally spaced electrode plates 12B are extended to the right and to the left from the arm portion 12A. The vibrating side detecting electrodes 12, and fixed side detecting electrodes 17 constitute a displacement detecting portion 21 to be described in more detail later.

Each of the vibrating side additional electrodes 13, the facing surfaces of which are formed as a saw-toothed uneven surface, and the fixed side additional electrodes 19 constitute a vibration adding portion 22 to be described in more detail later.

Each of the supporting portions 4 is mounted on the board 2 in a fixed condition while the first supporting beams 5, the first vibrator 6, the second supporting beams 7, and the second vibrator 8 are supported by the four supporting portions, respectively, so as to be a fixed distance away from the board 2. Further, as each of the first supporting beams 5 is extended in the direction of the Y axis, by bending the beams 5 in the direction of the X axis, the first vibrator 6 is able to be displaced in the direction of the X axis. As each of the second supporting beams 7 is extended in the direction of the X axis, by bending the beams 7 in the direction of the Y axis, the second vibrator 8 is able to be displaced in the direction of Y axis.

Numerals 14 represent fixed portions for vibration, and each of the fixed portions for vibration 14, which includes one of the fixed side vibrating electrodes 15, is arranged on the board 2 so as to sandwich the first vibrator 6 from both right and left sides. Each of the fixed side vibrating electrodes 15 is composed of six electrode plates 15A protruding from the fixed portion 14. Each electrode plate 15A is formed so as to interdigitate with and be spaced from a pair of electrode plates 11A of the vibrating side vibrating electrode 11.

Numerals 16 represent fixed portions for detection, and each of the fixed portions for detection 16, which includes one of the fixed side detecting electrodes 17, is located in the space between the second supporting beams 7 and the second vibrator 8. Each of the fixed side detecting electrodes 17 is composed of the arm portions 17A extended from both of the right and left ends of the fixed portion 16 in upwardly and downwardly directions, and six electrode plates 17B protrude inside from the arm portion 17A and are formed so as to interdigitate with but be spaced from a pair of electrode plates 12B of the vibrating side detecting electrode 12.

Numerals 18 represent fixed portions for addition, and each of the fixed portions for addition 18, which includes one of the fixed side additional electrodes 19, is arranged on the board 2 so as to sandwich the first vibrator 6 from the upper and lower sides. Each of the fixed side additional electrodes 19 is formed as an uneven surface, such as a saw-tooth, and is arranged so as to mesh with but be spaced from one of the saw-tooth-shaped vibrating side additional electrodes 13.

Each of the vibration generating portions 20 is composed of one of the vibrating side vibrating electrodes 11 and one of the fixed side vibrating electrode 15. Between each of the electrode plates 11A of the vibrating side vibrating electrode 11 and each of the electrode plates 15A of the fixed side vibrating electrode 15 a respective fixed spacing is formed. When a driving signal of a pulse wave, sine wave, etc. of a frequency f0 is applied in opposite phase between the vibrating side vibrating electrode 11 and the fixed side vibrating electrode 15, electrostatic attraction is alternately generated between the electrode plates 11A, 15A on the right and left. Accordingly, the electrode plates 11A, 15A repeatedly approach and separate one another in each of the vibration generating portions 20. Because of this, each of the vibration generating portions 20 causes the first vibrator 6 and the second vibrator 8 to vibrate in the direction of the X axis (in the direction of the first axis).

Each of the displacement detecting portions 21 is composed of one of the vibrating side detecting electrodes 12 and one of the fixed side detecting electrodes 17. Between each of the electrode plates 12B of the vibrating side detecting electrode 12 and each of the fixed side detecting electrode 17 a respective space is formed. Further, the vibrating side detecting electrode 12 and the fixed side detecting electrode 17 constitute a parallel flat capacitor for detection, and each of the displacement detecting portions 21 detects the change of spacing between each of the electrode plates 12B, 17B as change of electrostatic capacity.

The vibration adding portions 22 represent a frequency adjustment means, and each of the vibration adding portions 22 is composed of one of the vibrating side additional electrodes 13 and one of the fixed side additional electrodes 19. Between the vibrating side additional electrode 13 and the fixed side additional electrode 19 there is a respective spacing. When an additional DC signal is applied between the vibrating side additional electrode 13 and the fixed side additional electrode 19, an electrostatic attraction is caused between the additional electrodes 13, 19. However, as the movement of the first vibrator 6 in the direction of Y axis is regulated by the first supporting beams 5 and only movement in the direction of the X axis is allowed, the vibration adding portion 22 does not work unless the first vibrator 6 vibrates in the direction of the X axis. On the other hand, if the first vibrator 6 moves in the direction of the X axis, the right and left balance is lost in the vibration adding portion 22 and the electrostatic attraction between the electrodes having a narrower spacing therebetween is increased. As a result, this electrostatic attraction is added to the first vibrator 6 as a force in the direction of the X axis.

An angular velocity sensor 1 according to the present embodiment is constructed as described above. When an angular velocity Ω is applied around Z axis, the basic detecting operation is as follows.

First, when a driving signal in opposite phase is applied to the vibration generating portions 20 located right and left, the electrostatic attraction between each of the electrode plates 11A, 15A alternately acts on the right and left vibration generating portions 20, and the first vibrator 6 and the second vibrator 8 are caused to vibrate in the direction of the X axis. In this case, as only the first supporting beams 5 are bent in the direction of the X axis, while the second supporting beams 7 are not bent in the direction of the X axis, the second vibrator 8 also vibrates only in the direction of the X axis.

In this state, if an angular velocity Ω is applied around the Z axis (the third axis), a Coriolis force F (moment of inertia) shown by the following formula 2 is generated.

$$F = 2m\Omega v \qquad \text{Formula 2}$$

m: mass of second vibrator 8
Ω: angular velocity
v: speed of second vibrator in the direction of the X axis And because of this Coriolis force F, the second vibrator 8 is vibrated in the direction of the Y axis, and the change of vibration of the second vibrator 8 is detected by each of the displacement detecting portions 21 as a change of electrostatic capacity between the vibrating side detecting electrode 12 and the fixed side detecting electrode 17, and the angular velocity Ω around Z axis can be detected.

Next, the operation of the vibration adding portions 22 is further explained. First, between the vibrating side additional electrode 13 and the fixed side additional electrode 19 an additional signal is being applied. At this time, as the first vibrator 6 is not vibrated, electrostatic attraction generated in the vibration adding portions 22 located upwardly and downwardly is balanced by alternately pulling the first vibrator 6 upward and downward.

When a vibration is given to the first vibrator 6 by the vibration generating portions 20, the spacing between the vibrating side additional electrode 13 and the fixed side additional electrode 19 becomes imbalanced toward either the right or the left side and the electrostatic attraction is increased at the side of closer spacing. Then, this increased electrostatic attraction becomes a force to be added in the direction of the X axis, and this force is added to the first vibrator 6 so as to vibrate the vibrator 6 with a higher amplitude in the direction of the X axis. The vibration added by the vibration adding portion 22 is increased in accordance with the displacement of the first vibrator 6 in the direction of the X axis.

In this way, the vibration adding portion 22 is able to make the spring constant of the first supporting beam seemingly small by making the first vibrator 6 vibrate with a high amplitude to make the vibrating side resonance frequency f1 of the vibration system 9 low. Further, if the additional DC signal added between the electrodes 13, 19 is increased, the vibration added is increased and the vibration adding portion 22 is able to reduce the vibrating side resonance frequency f1 of the vibration system 9 and to approximate the frequency f1 to the detecting side resonance frequency f2 of the detection system 10 in the direction of the Y axis.

As a result, by approximating the vibrating side resonance frequency f1 of the vibration system 9 to the detecting side resonance frequency f2 of the detection system 10 and further to the frequency f0 of the driving signal to be applied to the vibration generating portion 20, the first vibrator 6 and the second vibrator 8 may be vibrated with a high amplitude to increase the speed v of the vibrator according to formula 2. Because of this, the Coriolis force is increased and the displacement of the second vibrator is increased, and as the result the angular velocity added around the Z axis can be detected in a highly precise manner.

Further, in an angular velocity sensor 1, even if because of change of the spring constant of the first supporting beam 5, etc. due to changes over time, etc. the vibrating side resonance frequency f1 of the vibration system 9 changes, by controlling the additional signal to be applied to the vibration adding portion 22 from outside it is possible to approximate the vibrating side resonance frequency f1 of the vibration system 9 to the detecting side resonance frequency f2 of the detection system 10. Accordingly, it is possible at all times to detect the angular velocity in a highly precise manner and to heighten the reliability of the angular velocity sensor 1.

Moreover, in the vibration adding portion 22, as the facing surfaces of the vibrating side additional electrode 13 and the fixed side additional electrode 19 are formed as an uneven surface, like a saw-tooth, so that the opposite surfaces of the electrodes face each other in an oblique way, the vibrating amplitude of the vibrator 6 in the direction of the X axis may be made higher than in the vibration adding portion constructed using a comb-like electrode configuration.

Figure 5:
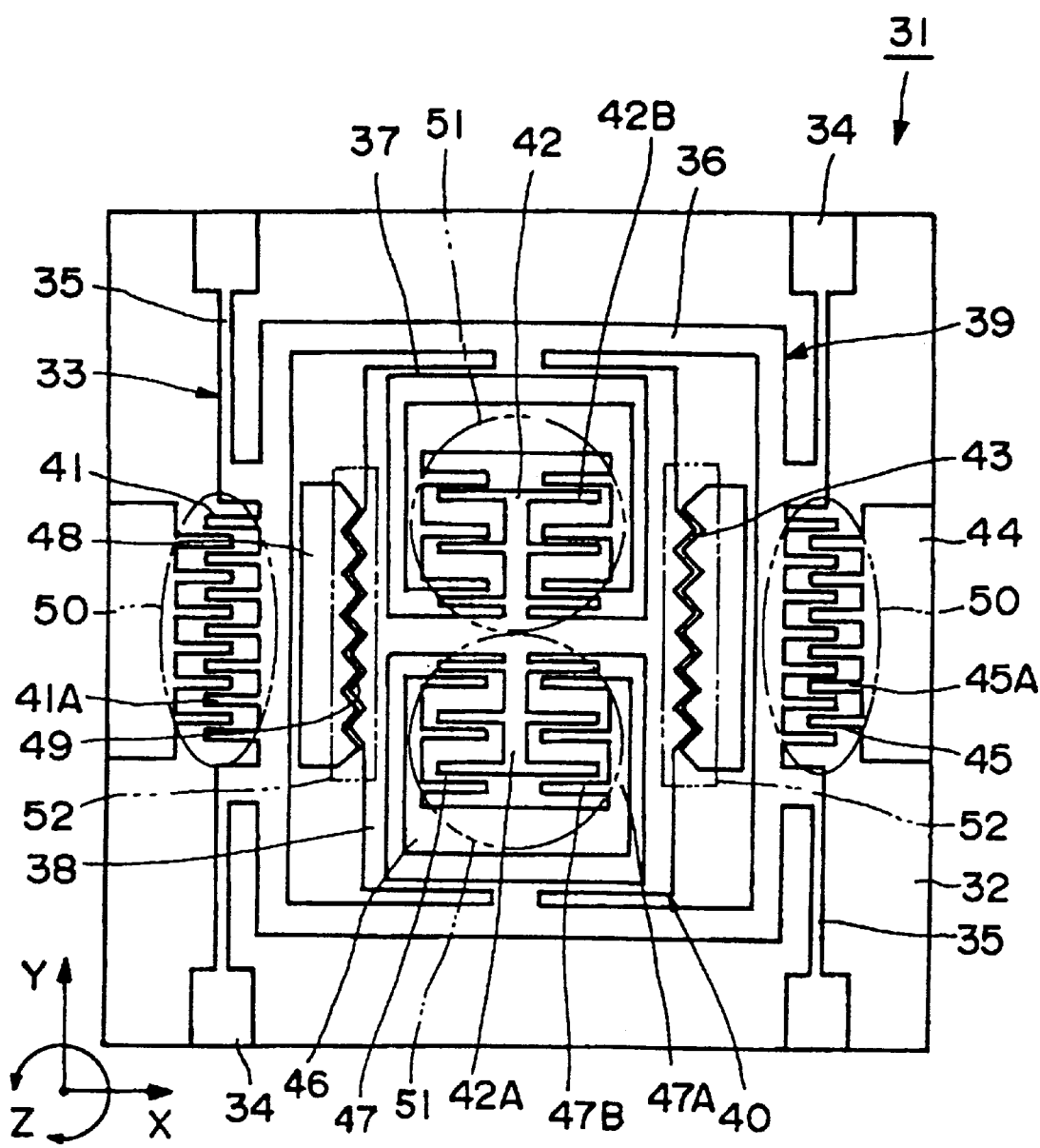
FIG. 5 is a front view of an angular velocity sensor according to a second embodiment.

Next, based on FIG. 5, an angular velocity sensor applicable to a second embodiment according to the present invention is described. The second embodiment is characterized by a vibration adding means given to the detection system. More, in the second embodiment, the same reference numerals are given to the same construction elements as in the first embodiment and their explanation is omitted.

Numerals 31 represents an angular velocity sensor applicable to the present embodiment. The angular velocity sensor 31 is in substance composed of a board 32 in a square form and a movable portion 33 formed on the board 33 nearly in the same manner as the angular velocity sensor 1 described in the first embodiment.

The movable portion 33 is composed of: four supporting portions 34 located at the four corners of the board 32; four first supporting beams 35 extended from each of the supporting portions 34 in the direction of the Y axis; a first vibrator 36 formed in the shape of a square framework which is supported by each of the first supporting beams 35 in such a way that the first vibrator 36 is spaced from the surface of the board 32 so as to be able to be displaced in the direction of the X axis; two second supporting beams 37 extended in the direction of the X axis and each protruding from the middle of respective short sides of the first vibrator 36, and a second vibrator 38 formed in the form of an H and arranged so as to be able to be vibrated in the direction of the Y axis through each of the supporting beams 37.

The first supporting beams 35, first vibrator 36, second vibrator 38 constitute a vibration system 39 vibrating in the direction of the X axis and having a vibrating side resonance frequency f1, and the second supporting beams 37 and the second vibrator 38 constitute a detection system 40 vibrating in the direction of the Y axis and having a detecting side resonance frequency f2.

Further, in the first vibrator 36, vibrating side vibrating electrodes 41 arranged in a comb-like configuration and made up of seven electrode plates 41A are formed on and protrude from each of its right and left long sides, and in the center of the middle portion of the second vibrator 38, vibrating side detecting electrodes 42 in the form of an antenna and made up of an arm portion 42A extending upwardly and downwardly. Six equally spaced electrode plates 42B are extended to the right and to the left from the arm portion 42A. In addition, on the right and left sides of the second vibrator 38, vibrating side additional electrodes 43, the outside surface of which is made saw-toothed and uneven, are formed.

Numerals 44 represent fixed portions for vibration located on the board 32 so as to sandwich the first vibrator 36 from both right and left sides. In each of the fixed portions 44 fixed side vibrating electrodes 45 made up of six electrode plates 45A are formed such as to protrude inwardly.

Numerals 46 represent fixed portions for detection located in the space between the second supporting beams 37 and the second vibrator 38. In each of the fixed portions for detection, fixed side detecting electrodes 47 made up of arm portions 47A extend upwardly and downwardly from both right and left sides and have six electrode plates 47B which extend inwardly from each of the arm portions 47A.

Numerals 48 represent fixed portions for addition, and each of the fixed portions for addition is located between the first vibrator 36 and the second vibrator 38 and at the right and left sides. Numerals 49 represent fixed side additional electrodes, and each of the fixed side additional electrodes 49 is formed to be uneven like a saw-tooth so as to mesh with but be spaced from one of the vibrating side additional electrodes 43.

Numerals 50 represent vibration generating portions, and each of the vibration generating portions 50 is composed of one of the vibrating side vibrating electrodes 41 and one of the fixed side vibrating electrodes 45. And each of the vibration generating portions 50 functions to make the first vibrator 36 and the second vibrator 38 vibrate in the direction of the X axis (the direction of a first axis).

Numerals 51 represent displacement detecting portions, and each of the displacement detecting portions 51 is composed of one of the vibrating side detecting electrodes 42 and one of the fixed side detecting electrodes 47. And each of the displacement detecting portions 51 detects the change of spacing between electrode plates 42B, 47B as a change of electrostatic capacity.

Numerals 52 represent vibration adding portions as a frequency adjustment means given in the detection system 40, and each of the vibration adding portions is composed of one of a pair of vibrating side additional electrodes 43 and one of the fixed side additional electrodes 49.

Detecting of the angular velocity Ω around the Z axis is performed as follows.

The angular velocity sensor 31 adds a force in the direction of the Y axis to the second vibrator 38 by the vibration adding portion 52 when the second vibrator 38 vibrates in the direction of the Y axis and there is an angular velocity Ω around the Z axis. Because of this, the second vibrator 38 is made to vibrate with a high amplitude in the direction of the Y axis, the spring constant of the second supporting beams 3 is made seemingly small, the detecting side resonance frequency f2 of the detection system 40 is made low, and the detecting side resonance frequency f2 of the detection system 40 is able to be approximated to the vibrating side resonance frequency f1 of the vibration system 39. As a result, the second vibrator 38 is able to vibrate with a high amplitude in the direction of the Y axis to increase the signal to be detected by the displacement detecting portion 21 and heighten the detection sensitivity.

Figure 6:
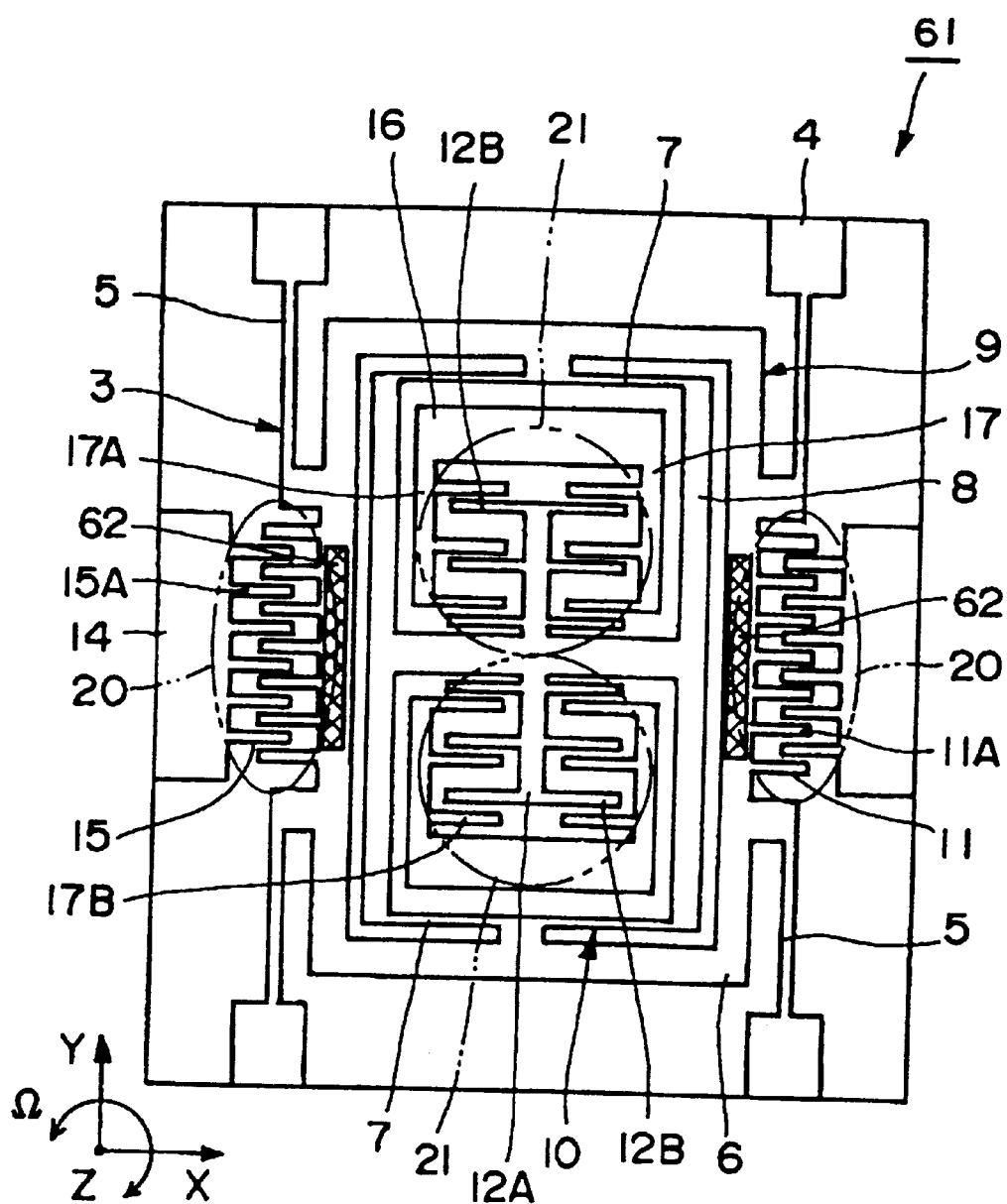
FIG. 6 is a front view of an angular velocity sensor according to a third embodiment.

Next, based on FIG. 6, an angular velocity sensor according to a third embodiment is explained. In the third embodiment, the vibration adding portion 22 of the angular velocity sensor 1 described in the first embodiment is eliminated. However, as other construction elements are the same, the same reference numerals are given and their explanation is omitted.

An angular velocity sensor 61 according to the present embodiment is characterized by the weights 62 on the upper surface of the long sides located right and left of the first vibrator 6. Each of the weights 62 is formed into the form of a thin film by evaporation of metals such as Au, Ag, etc. More, as the weights 62 are formed on the right and left long sides of the first vibrator 6 respectively, the first vibrator 6 is balanced.

In the angular velocity sensor 61 according to the present embodiment, the weights 62 on the right and left long sides of the first vibrator 6 serve as a frequency adjustment means. More specifically, the mass of the first vibrator 6 is made heavier by the weight 62, the vibrating side resonance frequency f1 of the vibration system 9 is lowered. As a result, the vibrating side resonance frequency f1 of the vibration system 9 is approximated to the detecting side resonance frequency f2 of the detection system 10, and the detection sensitivity of the angular velocity Ω is able to be heightened.

Furthermore, trimming and adjustment of the weight 62 by a laser beam, a concentrated ion beam, etc. makes it possible to increase the vibrating side resonance frequency f1 and widen the limits of adjustment of the vibrating side resonance frequency f1.

Figure 7:
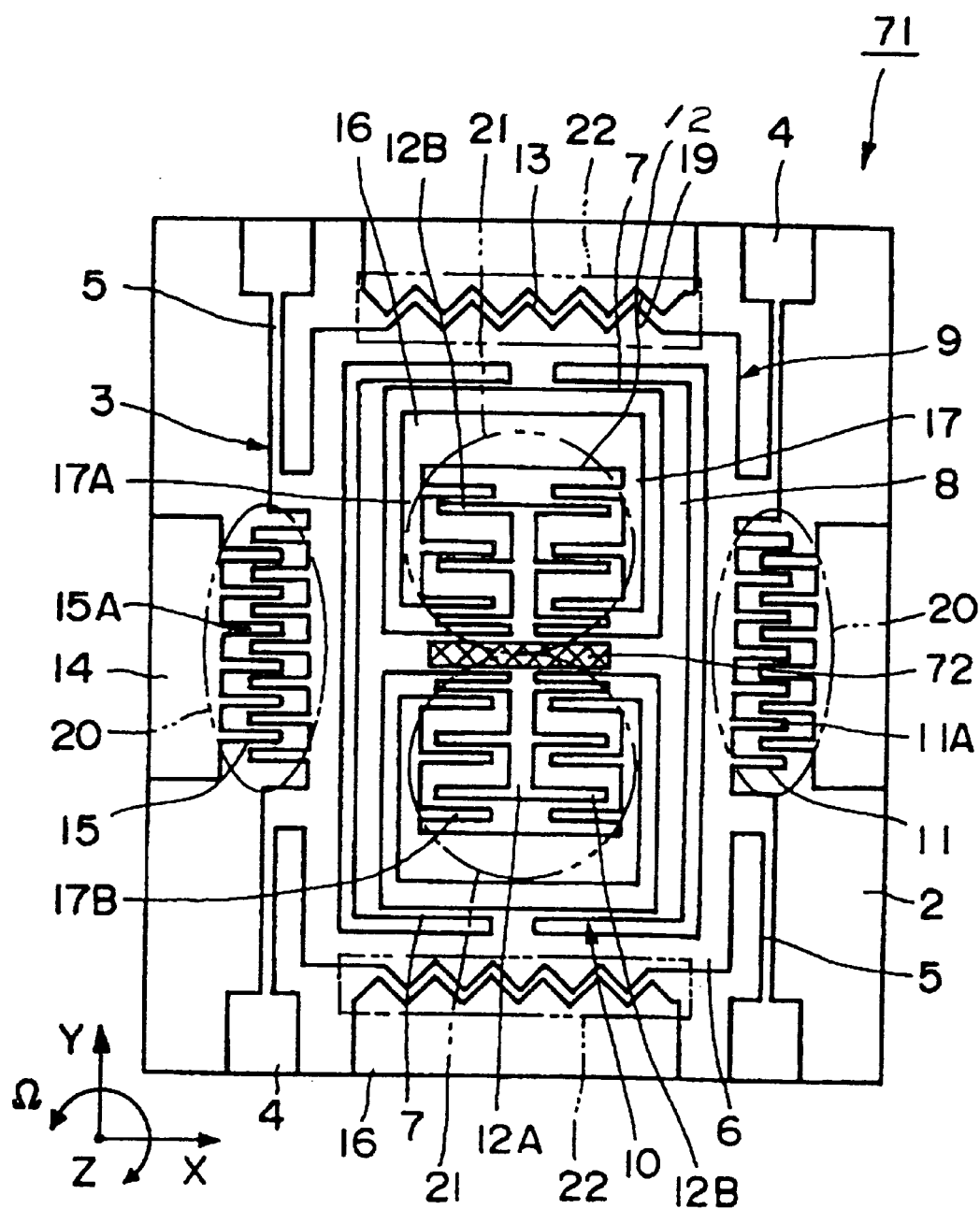
FIG. 7 is a front view of an angular velocity sensor according to a fourth embodiment.

Next, with reference to FIG. 7 an angular velocity sensor applicable to a fourth embodiment according to the present invention is explained. Here, in the fourth embodiment, the same reference numerals are given to the same construction elements as in the first embodiment described before, and their explanation is omitted.

The angular velocity sensor 71 according to the fourth embodiment is characterized by a weight 72 formed on the central upper surface of the second vibrator 8. The weight 72 is formed in the form of a thin film by evaporation of metals of Au, Ag, etc. And as the weight 72 is formed in the middle portion of the vibrator 8, the vibrator 8 is balanced.

The angular velocity sensor 71 according to the fourth embodiment has a vibration adding portion 22 which is arranged in the same way as the angular velocity sensor 1 according to the first embodiment; accordingly, the vibrating side resonance frequency f1 of the vibration system 9 can be adjusted by controlling the additional signal to be applied to the vibration adding portion 22. On the other hand, by adjusting the weight of the weight 72 formed in the central portion of the second vibrator 8 the detecting side resonance frequency f2 of the detection system 10 can be adjusted.

Because of this, in the angular velocity sensor 71, the vibrating side resonance frequency f1 and the detecting side resonance frequency f2 are made to approximate each other by adjusting the weight of the weight 72, and even if the spring constant of the supporting beams 5, 7 is changed due to manufacturing errors, changes over time, etc., adjustment of the vibrating side resonance frequency f1 of the vibration system 9 may be made by controlling an additional signal applied to the vibration adding portion 22, and therefore, the detection sensitivity of the angular velocity Ω can be more securely heightened.

Figure 8:
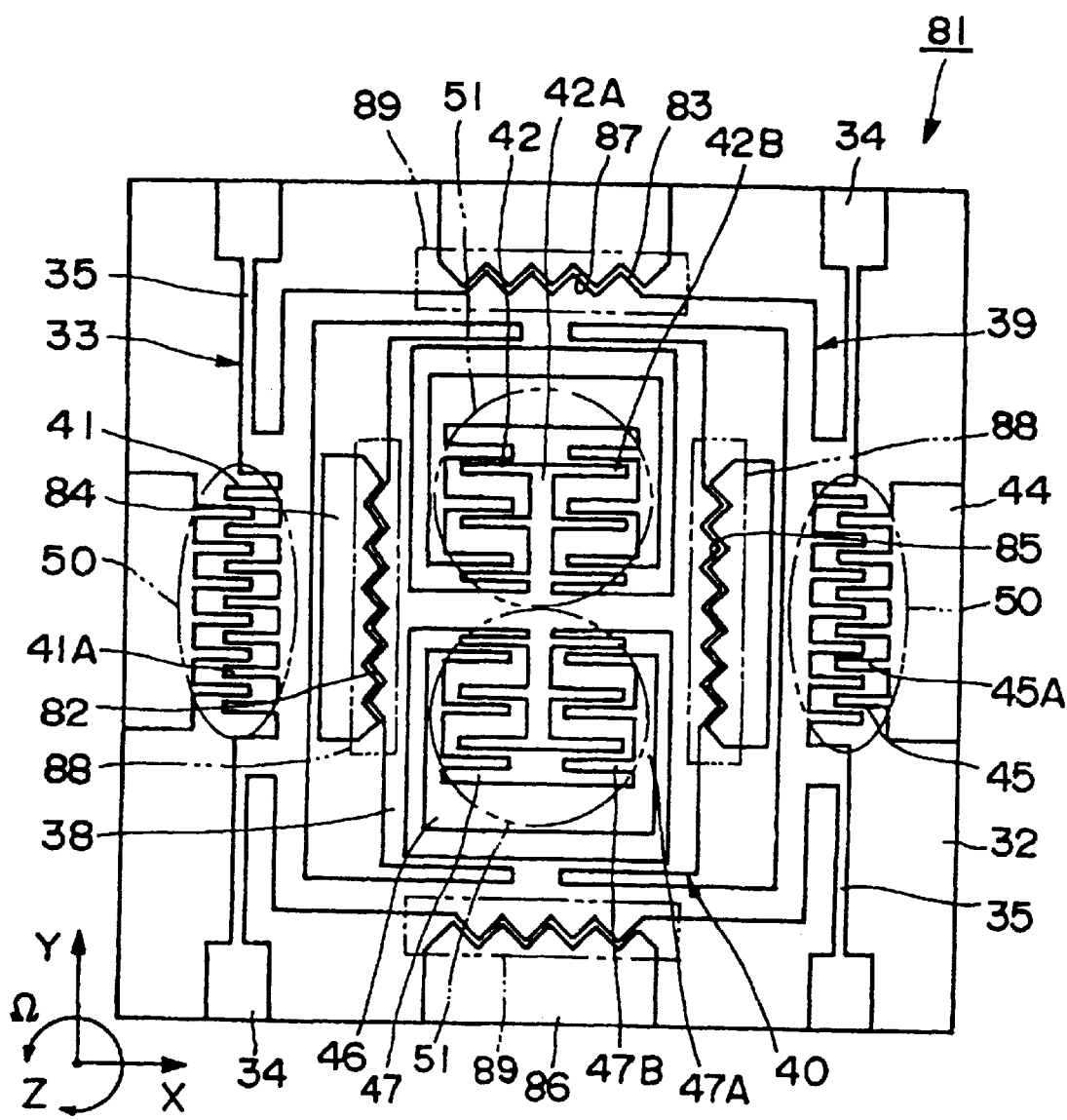
FIG. 8 is a front view of an angular velocity sensor according to a fifth embodiment.

An angular velocity sensor applicable to a fifth embodiment according to the present invention is described in connection with FIG. 8. The fifth embodiment is characterized by a vibration adding means given to the vibration system of the angular velocity sensor 31 according to the second embodiment. In the present embodiment, the same reference numerals are given to the same construction elements as in the above-described second embodiment and their explanation is omitted.

Numerals 81 represents an angular velocity sensor used for the present embodiment, and although the angular velocity sensor 81 is constructed nearly in the same way as the angular velocity sensor 31 described in the second embodiment, it differs in that on the upper and lower sides of the first vibrator 36 of the movable portion 33, first vibrating side additional electrodes 83, the external surfaces of which are made saw-toothed and uneven, are formed, and on the right and left sides of the second vibrator 38 second vibrating side additional electrodes 82, the external surface of which are saw-toothed and uneven, are formed.

Numerals 84 are first additional fixed portions disposed on the board 2 so as to sandwich the first vibrator 36 from the left and right sides, and on the side surface of each of the first additional fixed portions 84 first fixed side additional electrodes 85, which are saw-to other and uneven, are formed so as to mesh with but be spaced one of the first vibrating side additional electrodes 82.

Numerals 86 represent second additional fixed portions located right and left between the first vibrator 36 and the second vibrator 38 and on the side surface of each of the second additional fixed portions 86, second fixed side additional electrodes 87, which are saw-toothed and uneven, are formed so as to mesh with but be spaced from one of the second vibrating side additional electrodes 83.

Numerals 88 represent first vibration adding portions as a frequency adjustment means for the vibration system, and each of the first vibration adding portions 88 is composed of one of the first vibrating side additional electrodes 82 and one of the first fixed side additional electrodes 85.

Numerals 89 represent second vibration adding portions as a frequency adjustment means for the detection system 40, and each of the second vibration adding portions 89 is composed of one of the second vibrating side additional electrodes 83 and one of the second fixed side additional electrodes 87.

In this way, the vibrating side resonance frequency f1 of the vibration system 39 can be adjusted by controlling an additional signal to be applied to the first vibration adding portion 88 and the detecting side resonance frequency f2 of the detection system 40 can be adjusted by controlling an additional signal to be applied to the second vibration adding portion 89.

Because of this, in the angular velocity sensor 81, the vibrating side resonance frequency f1 and the detecting side resonance frequency f2 are able to be made to approximate each other by adjustment of an additional signal to be applied to each of the vibration adding portions 88, 89, and the detection sensitivity is able to be securely heightened by increase of the amplitude of the first vibrator 36 in the direction of the X axis and the amplitude of the second vibrator 38 in the direction of the Y axis.

It is to be understood that in the description of the several embodiments of the invention, although the vibrating side additional electrodes 13 and the fixed side additional electrodes 19 constituting the vibration adding portions 22 and others were described as being formed in a saw-toothed and uneven shape, the present invention is not restricted to this, and a plurality of comb-like electrodes and electrodes in the shape of an antenna may be also used.

Furthermore, in the description of the several embodiments, the vibration adding means and the weight were described as being separately given to the vibration system or the detection system, but both the vibration adding means and the weight may be given to the vibration system and both the vibration adding means and the weight may be given to the detection system. More, the frequency adjustment means may be composed of various combinations.

Additionally, in the description of the several embodiments, the cases in which the vibrating side vibrating electrodes 11 (41) have seven electrode plates 11A (41A) and the fixed side vibrating electrodes 15 (45) have six electrode plates 15A (45A) were described, but the present invention is not limited to these and more or less than the described number of electrode plates may be used. However, by increasing the number of electrode plates the driving force generated in the vibration generating portion can be increased.

More, in the description of the several embodiments, the cases in which the vibrating side detecting electrodes 12 (42) have six electrode plates 12B (42B) and the fixed side detecting electrodes 16 (47) have six electrode plates 16B (47B) were described, but the present invention is not limited to these and more or less than the described number of electrode plates may be used. However, by increasing the number of electrode plates the detection sensitivity of the displacement detecting portions 21 (51) can be heightened.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. An angular velocity sensor comprising:

a board;

a first vibrator supported on the board through first supporting beams and arranged so as to be vibrated in the direction of a first axis;

a second vibrator supported on the first vibrator through second supporting beams and arranged so as to be vibrated in the direction of the first axis by the first vibrator and in the direction of a second axis at a right angle to the direction of the first axis when an angular velocity is applied to the second vibrator around a third axis at right angles to the first and second axes;

a vibration generating means to cause the first vibrator to vibrate in the direction of the first axis;

a displacement detecting means to detect a displacement of the second vibrator in the direction of the second axis when the angular velocity is applied around the third axis and when the vibration generating means causes the first vibrator to vibrate in the direction of the first axis; and a frequency adjustment means for adjusting a vibrating side resonance frequency when the first vibrator is vibrated in the direction of the first axis by the vibration generating means and adjusting the detecting side resonance frequency when the second vibrator is vibrated in the direction of the second axis by an angular velocity applied around the third axis, the frequency adjustment means including a vibrating side additional electrode formed on an end surface of the first vibrator and a fixed side additional electrode facing the vibrating side additional electrode and formed on a side of the board, the frequency adjustment means applying in the first direction an electrostatic attraction force caused between the vibrating side additional electrode and the fixed side additional electrode.

2. An angular velocity sensor comprising:

a board;

a first vibrator supported on the board through first supporting beams and arranged so as to be vibrated in the direction of a first axis;

a second vibrator supported on the first vibrator through second supporting beams and arranged so as to be vibrated in the direction of the first axis by the first vibrator and in the direction of a second axis at a right angle to the direction of the first axis when an angular velocity is applied to the second vibrator around a third axis at right angles to the first and second axes;

a vibration generating means to cause the first vibrator to vibrate in the direction of the first axis;

a displacement detecting means to detect a displacement of the second vibrator in the direction of the second axis when the angular velocity is applied around the third axis and when the vibration generating means causes the first vibrator to vibrate in the direction of the first axis; and a frequency adjustment means for adjusting a vibrating side resonance frequency when the first vibrator is vibrated in the direction of the first axis by the vibration generating means and adjusting the detecting side resonance frequency when the second vibrator is vibrated in the direction of the second axis by an angular velocity applied around the third axis, the frequency adjustment means comprising a vibration adding means for adding a force in the direction of the first axis to the first vibrator when the vibration generating means vibrates the first vibrator in the direction of the first axis, the vibration adding means comprising a vibrating side additional electrode formed on an end surface of the first vibrator and a fixed side additional electrode facing the vibrating side additional electrode and formed on a side of the board, the respective facing surfaces of the vibrating side additional electrode and the fixed side additional electrode being saw-toothed.

3. An angular velocity sensor comprising:

a board;

a first vibrator supported on the board through first supporting beams and arranged so as to be vibrated in the direction of a first axis;

a second vibrator supported on the first vibrator through second supporting beams and arranged so as to be vibrated in the direction of the first axis by the first vibrator and in the direction of a second axis at a right angle to the direction of the first axis when an angular velocity is applied to the second vibrator around a third axis at right angles to the first and second axes;

a vibration generating means to cause the first vibrator to vibrate in the direction of the first axis;

a displacement detecting means to detect a displacement of the second vibrator in the direction of the second axis when the angular velocity is applied around the third axis and when the vibration generating means causes the first vibrator to vibrate in the direction of the first axis; and a frequency adjustment means for adjusting a vibrating side resonance frequency when the first vibrator is vibrated in the direction of the first axis by the vibration generating means and adjusting the detecting side resonance frequency when the second vibrator is vibrated in the direction of the second axis by an angular velocity applied around the third axis, the frequency adjustment means comprising a vibration adding means for adding a force in the direction of the second axis to the second vibrator, the vibration adding means comprising a vibrating side additional electrode formed on an end surface of the second vibrator and a fixed side additional electrode facing the vibrating side additional electrode and formed on a side of the board, the respective facing surfaces of the vibrating side additional electrode and the fixed side additional electrode being saw-toothed.

4. An angular velocity sensor comprising:

a board;

a first vibrator supported on the board through first supporting beams and arranged so as to be vibrated in the direction of a first axis;

a second vibrator supported on the first vibrator through second supporting beams and arranged so as to be vibrated in the direction of the first axis by the first vibrator and in the direction of a second axis at a right angle to the direction of the first axis when an angular velocity is applied to the second vibrator around a third axis at right angles to the first and second axes;

a vibration generating means to cause the first vibrator to vibrate in the direction of the first axis;

a displacement detecting means to detect a displacement of the second vibrator in the direction of the second axis when the angular velocity is applied around the third axis and when the vibration generating means causes the first vibrator to vibrate in the direction of the first axis; and a frequency adjustment means for adjusting a vibrating side resonance frequency when the first vibrator is vibrated in the direction of the first axis by the vibration generating means and adjusting the detecting side resonance frequency when the second vibrator is vibrated in the direction of the second axis by an angular velocity applied around the third axis, the frequency adjustment means comprising a first vibration adding means for adding a force in the direction of the first axis to the first vibrator when the vibration generating means vibrates the first vibrator in the direction of the first axis and a second vibration adding means for adding a force in the direction of the second axis to the second vibrator, the second vibration adding means comprising a vibrating side additional electrode formed on an end surface of the second vibrator and a fixed side additional electrode facing the vibrating side additional electrode and formed on a side of the board, the respective facing surfaces of the vibrating side additional electrode and the fixed side additional electrode being saw-toothed.

5. An angular velocity sensor comprising:

a board;

a first vibrator structured and arranged to be vibrated in the direction of a first axis with respect to the board;

a second vibrator supported on the first vibrator and structured and arranged so as to be vibrated in the direction of the first axis by the first vibrator and in the direction of a second axis at a right angle to the direction of the first axis when an angular velocity is applied to the second vibrator around a third axis at right angles to the first and second axes;

a vibration generator to cause the first vibrator to vibrate in the direction of the first axis;

a displacement detector to detect a displacement of the second vibrator in the direction of the second axis when the angular velocity is applied around a third axis; and a frequency adjuster for adjusting a resonant frequency of vibration or a resonant frequency of detection or respective resonant frequencies of vibration and detection, the frequency adjuster including a vibrating side additional electrode formed on an end surface of the second vibrator and a fixed side additional electrode facing the vibrating side additional electrode and formed on a side of the board, the frequency adjuster applying in the second direction an electrostatic attraction force caused between the vibrating side additional electrode and the fixed side additional electrode.

6. An angular velocity sensor comprising:

a first vibrator structured and arranged to be vibrated in the direction of a first axis;

a second vibrator supported on the first vibrator and structured and arranged so as to be vibrated in the direction of the first axis by the first vibrator and in the direction of a second axis at a right angle to the direction of the first axis when an angular velocity is applied to the second vibrator around a third axis at right angles to the first and second axes;

a vibration generator to cause the first vibrator to vibrate in the direction of the first axis;

a displacement detector to detect a displacement of the second vibrator in the direction of the second axis when the angular velocity is applied around a third axis; and a frequency adjuster for adjusting a resonant frequency of vibration or a resonant frequency of detection or respective resonant frequencies of vibration and detection, the frequency adjuster adds a force in the direction of the first axis to the first vibrator when the first vibrator is vibrated in the direction of the first axis by the vibration generator, the frequency adjustor comprising a vibrating side additional electrode formed on an end surface of the first vibrator and a fixed side additional electrode facing the vibrating side additional electrode and mounted on a support member, the respective facing surfaces of the vibrating side additional electrode and the fixed side additional electrode being saw-toothed.

7. An angular velocity sensor comprising:

a first vibrator structured and arranged to be vibrated in the direction of a first axis;

a second vibrator supported on the first vibrator and structured and arranged so as to be vibrated in the direction of the first axis by the first vibrator and in the direction of a second axis at a right angle to the direction of the first axis when an angular velocity is applied to the second vibrator around a third axis at right angles to the first and second axes;

a vibration generator to cause the first vibrator to vibrate in the direction of the first axis;

a displacement detector to detect a displacement of the second vibrator in the direction of the second axis when the angular velocity is applied around a third axis; and a frequency adjuster for adjusting a resonant frequency of vibration or a resonant frequency of detection or respective resonant frequencies of vibration and detection, the frequency adjuster adding a force in the direction of the second axis to the second vibrator and comprising a vibrating side additional electrode formed on an end surface of the second vibrator and a fixed side additional electrode facing the vibrating side additional electrode and mounted on a support member, the respective facing surfaces of the vibrating side additional electrode and the fixed side additional electrode being saw-toothed.

8. An angular velocity sensor comprising:

a first vibrator structured and arranged to be vibrated in the direction of a first axis;

a second vibrator supported on the first vibrator and structured and arranged so as to be vibrated in the direction of the first axis by the first vibrator and in the direction of a second axis at a right angle to the direction of the first axis when an angular velocity is applied to the second vibrator around a third axis at right angles to the first and second axes;

a vibration generator to cause the first vibrator to vibrate in the direction of the first axis;

a displacement detector to detect a displacement of the second vibrator in the direction of the second axis when the angular velocity is applied around a third axis; and a frequency adjuster for adjusting a resonant frequency of vibration or a resonant frequency of detection or respective resonant frequencies of vibration and detection, the frequency adjuster adding a force in the direction of the first axis to the first vibrator when the first vibrator is vibrated in the direction of the first axis by the vibration generator, and adding a force in the direction of the second axis to the second vibrator, the frequency adjuster comprising a vibrating side additional electrode formed on an end surface of the first vibrator and a fixed side additional electrode facing the vibrating side additional electrode and mounted on a support member, the respective facing surfaces of the vibrating side additional electrode and the fixed side additional electrode being saw-toothed.

* * * * *